May 29, 1945.  F. H. PETERSON  2,377,263
BUTTON ATTACHING MACHINE
Filed June 1, 1943   6 Sheets-Sheet 1

Fig.1.

Inventor:
Frederick H. Peterson,
By Parker Cook.
Attorney.

May 29, 1945.  F. H. PETERSON  2,377,263
BUTTON ATTACHING MACHINE
Filed June 1, 1943  6 Sheets-Sheet 6

Inventor:
Frederick H. Peterson,
By Parker Cook
Attorney.

Patented May 29, 1945

2,377,263

UNITED STATES PATENT OFFICE 2,377,263

BUTTON ATTACHING MACHINE

Frederick H. Peterson, Watertown, Conn., assignor to The Patent Button Company, Waterbury, Conn., a corporation of Connecticut Application June 1, 1943, Serial No. 489,283

1 Claim. (Cl. 218—6)

My invention relates to new and useful improvements in button attaching machines, and more particularly to a machine that is designed to attach what I term a double button.

It has been found desirable in the manufacture of Army tents, for instance, that the top be provided along its edges with buttons both on the upper and under surfaces, as the one surface may be camouflaged in one color to be used under certain conditions, whereas the opposite surface may be camouflaged in a different color to be used under other conditions; and it is therefore desirable that the buttons which are to be buttoned to the side walls of the tent be provided on both the upper and under surfaces of the top.

To eliminate a duplication of buttonholes in the side walls, etc., it is also desirable that the button on the one surface be directly opposite the button on the opposite surface so that regardless of which forms the outer surface when the tent is put up, a button will be in position to register with its buttonhole in the side wall.

One of the objects, therefore, of the present invention is to provide a machine for attaching what I term a double button—that is, an open top button which has been previously provided with a tack extending through the same, which button with its face down will be fed to the attaching station of the machine, and over which will be positioned another open top button face up, so that when the double button is attached the tack carried in the lower of the open face buttons will be forced through the material to which the button is to be attached up into the open top button and there deformed so that the two buttons will be clenched back-to-back against the intermediate cloth. Thus there is in reality a double button, one on the upper side of the cloth and one on the other side, and these buttons being in a back-to-back relationship form a strong gripping action with respect to the cloth and to each other.

Still another object of the invention is to provide a button attaching machine of the same general type as that shown in my former patent, to wit: F. H. Peterson, #1,901,375, March 14, 1933, for Button attaching machines; and also somewhat similar to the patent to F. R. White, #1,901,386, March 14, 1933, for Button attaching machines; and Patent #1,567,882 to F. R. White, December 29, 1925, for Button attaching machines. Also, the tucker mechanism for advancing the tack with the exception of a few details is the same as that shown in my pending application filed April 9, 1942, Ser. No. 438,315, for Tucker mechanism, now patent number 2,337,268, granted December 21, 1943.

Likewise, in these several patents mentioned, the button heads are placed in the button hopper, while the tacks are placed in a second hopper and the machine so arranged and the parts so synchronized that a tack will be properly released and advanced to an attaching station or anvil, over which will always be positioned a button head held by the button jaws. Then when the attaching plunger descends forcing the button head with it, the garment or material held by the operator over the tack will be pierced by the prong of the tack and the tack driven into the descending overlying button head and there deformed to thus rigidly fasten the tack within its button head.

As heretofore mentioned, all the parts are synchronized and the feeding and attaching wholly automatic on each operation of the machine.

For further specific understanding of these types of machines as to the different escapements, synchronizing actions, tucker slides, tack holding jaws and button holding jaws, etc., reference can be made to the patents above mentioned, to wit: F. H. Peterson #1,901,375; F. R. White #1,901,386; and F. R. White #1,567,882.

Another object of the present invention is to provide a machine of the type just mentioned in which is incorporated these hoppers, tack chutes, tucker mechanism, escapement means and synchronizing levers, etc., together with a mechanism including a backing up post that will be momentarily projected within what will hereinafter be termed the "base button" (which forms the one half of the double button), so that when the other button or what will hereinafter be termed the "top button" is forced downwardly onto the prong of the base button and the prong driven through the cloth up into the top button and there deformed by the attaching plunger, the post which has been extended or projected up within the base button will back up the tack in the base button during the deforming action of the tack prong and thus provide a proper deformation and clenching of the tack to thus securely hold the double button to its garment.

A backing up of the tack in the base button is absolutely necessary, as if this were not done the tack on the attaching operation would be merely driven downwardly in its base button, rather than deformed.

Still another object of the invention is to provide a button attaching machine for attaching a double button to tents and other articles where a double button might be useful and the machine so arranged, as heretofore mentioned, that just before the attaching operation takes place a small supplemental anvil or post will be projected up into the base button to thus back up the tack which has previously been inserted in the base button and furthermore, after the attaching operation has taken place and on the upward movement of the attaching plunger, this supplemental post or anvil will be retracted from the base button so that the operator can freely move the garment or article within the machine preparatory to attaching the next button.

In other words, when the material is inserted in the machine and placed over the attaching anvil, the face of the anvil will present a plane surface to the face of the base button as the supplemental anvil or post will be in its lower position. Then on the attaching operation the post is projected up into the base button to be withdrawn again therefrom after the attaching operation so that this backing-up post between operations in no way interferes with the free movement of the garment or material by the operator.

It might also be mentioned here that after the tack has been deformed and the button fastened to the cloth and the plunger ascends and the backing-up post lowers, the succeeding button being forced on the anvil by the tucker finger will push the attached button and its cloth off the anvil to make room for the succeeding button.

Still another object of the invention is to provide a button attaching machine wherein the base button will be released and properly advanced face down to the attaching station and there held in a position to receive the backing-up post that will be moved up into the same during the attaching operation; and to also provide the feeding mechanism for the top button which is also an open face button so that it will be properly fed into the button holding jaws that overlie the attaching station. Of course the mechanisms are synchronized so that on the attaching operation—that is, the descent of the attaching plunger, the backing-up post will be forced up into the base button on the attaching station and the attaching plunger forced down into the face of the top button to deform the prong of the tack in the top button and thus grip the cloth between the two buttons that are now fastened in a back-to-back relationship.

It will be understood that there is a protruding nose on the face of the attaching plunger that will extend down within the hub of its top button, the nose being similar in shape to the end of the backing-up post that extends up into the base button, but this nose on the attaching plunger is secured to and is a part of the plunger rather than moving with relation to it.

Still another object of the invention is to provide a backing-up mechanism for the tack in the base button which mechanism is in its backing-up position only during a part of the downward movement of the attaching plunger so that the post in no way hinders the insertion or removal of the cloth in the machine.

Still another object of the invention is to provide a button attaching machine wherein the backing-up mechanism is built into the type of machine heretofore mentioned, so a number of the former parts and mechanisms may be retained.

Still another object of the invention is to provide a backing-up of the tack in the base button during the attaching operation wherein the backing-up post is operated by a single cam-faced rod which in turn is normally held in one position by an arm and spring and moved to its other position through the operation of the main operating lever of the machine, as will be hereinafter mentioned.

Still another object of the invention is to provide a machine for attaching a double button in a rapid manner to a tent or other article wherein the buttons being positioned back-to-back provide an excellent gripping means for holding the buttons to the cloth and assuring a fastening that will not pull out or permit the material to tear between the buttons under the ordinary service to which the material will be subjected.

With these and other objects in view, the invention consists in certain new and novel arrangements and combination of parts as will be hereinafter more fully described and pointed out in the claim.

Referring now to the drawings showing a preferred embodiment.

At the outset it might be mentioned that the gist of the present invention is the provision and arrangement of a mechanism for backing up a tack carried by the base button during the attaching operation in the general type of button attaching machine illustrated in the patent to F. R. White #1,567,882 and in my Patent #1,901,375 and utilizing my tucker mechanism illustrated and disclosed in a pending application filed April 9, 1942, Ser. No. 438,315, thus retaining all of the principal advantages, elements and parts in that type of machine and making additions and changes in a number of the parts to assure a proper working and synchronization of the backing up mechanism with the feeding and attaching mechanism.

Furthermore, it will be understood that in the type of button attaching machine illustrated and described in the above-mentioned patents, the attaching anvil supported a tack during the attaching operation, as the tack in that instance was not incorporated in a base button and consequently any pressure placed on the prong of the tack was directed to the head of the tack resting on the anvil. However, in the present machine, it is not only necessary to support the tack carrying button on an anvil but it is further necessary to provide an additional post or die that will bear directly against the head of the tack, which tack is spaced considerably above the surface of the main anvil in its button during the attaching operation. Then the die or post is to be retracted between operations.

It is also to be understood that in the present application only that much of the Peterson type of button attaching machine proper is illustrated and described as is thought necessary to understand the general working of the machine plus, of course, the detailed description of the backing-up mechanism for the tack.

Figure 1:
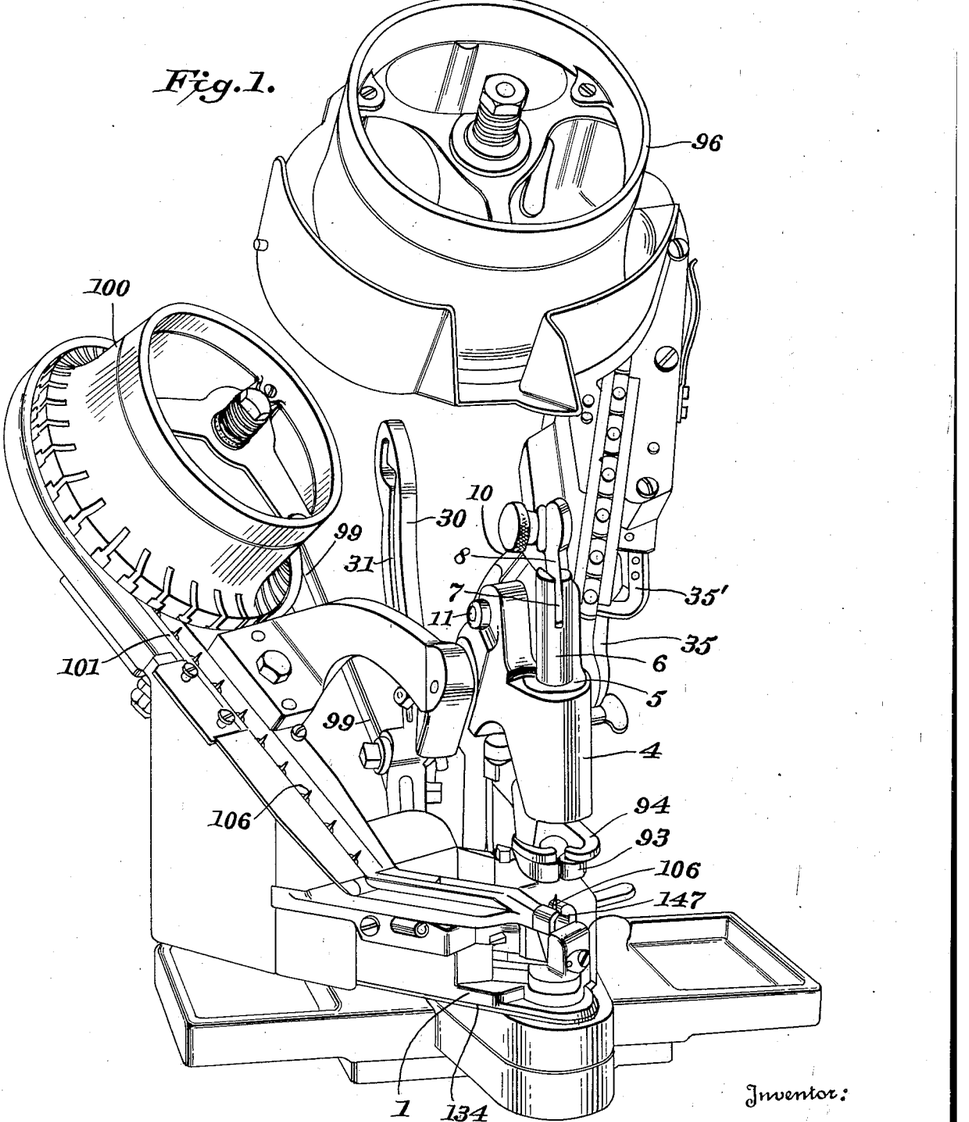
Fig. 1 is a perspective view of the button attaching machine showing the hopper for the base buttons and the top buttons, some of the parts being omitted for the sake of clearness of illustration.
Figures 2, 5:
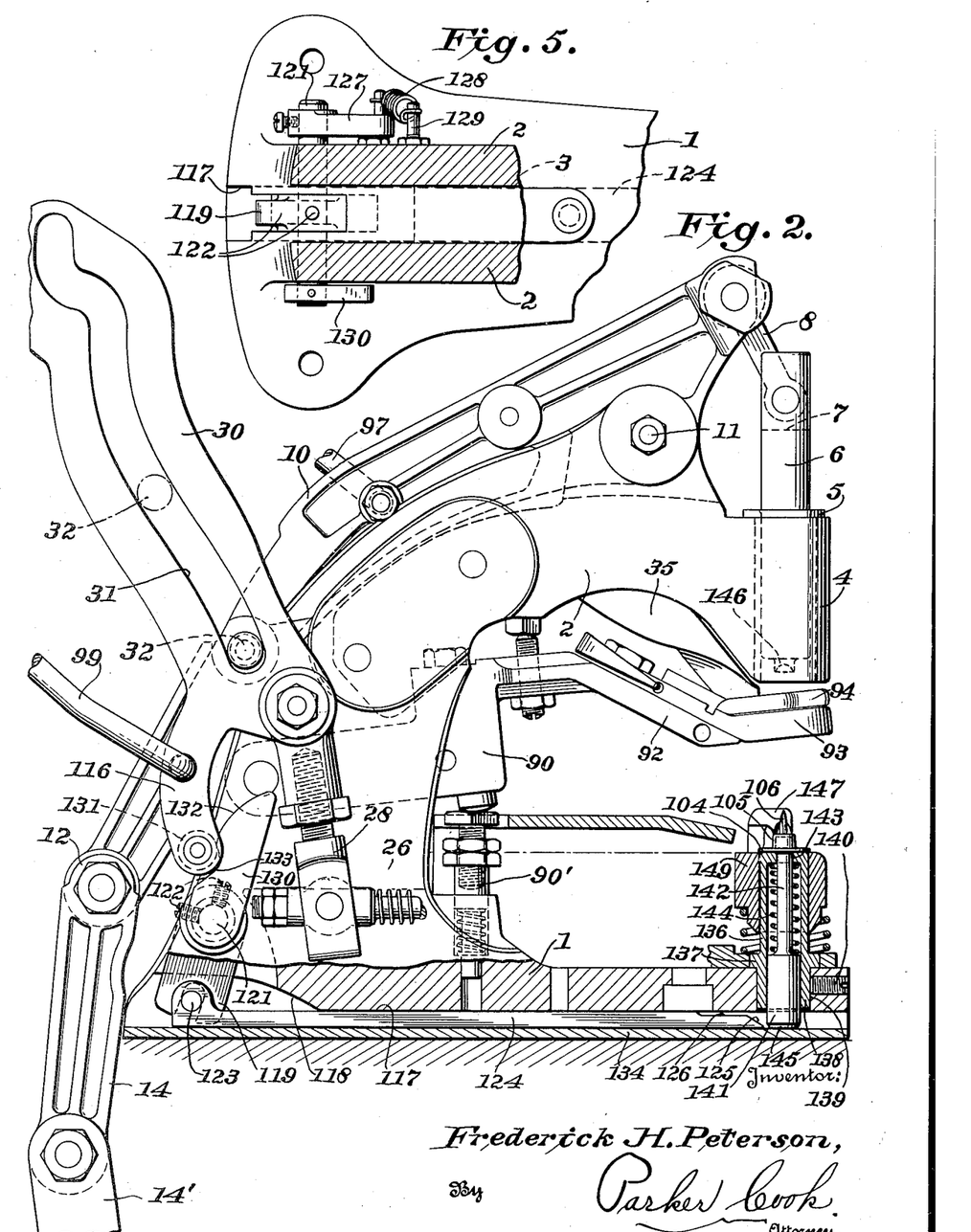
Fig. 2 is a side elevational view of the machine from the base button side, taken in a plane parallel with the oscillating lever, many parts being removed for the sake of clearness of illustration; the backing-up mechanism being shown partly in section, a base button being shown on the anvil and the backing-up post and the attaching plunger and the several cooperating parts all being in their non-operated position.
Fig. 5 is a fragmentary top plan view, partly in section, showing the construction of the rear portion of the cam-faced rod and its associated mechanism that operates the backing-up post in the anvil.
Figure 3:
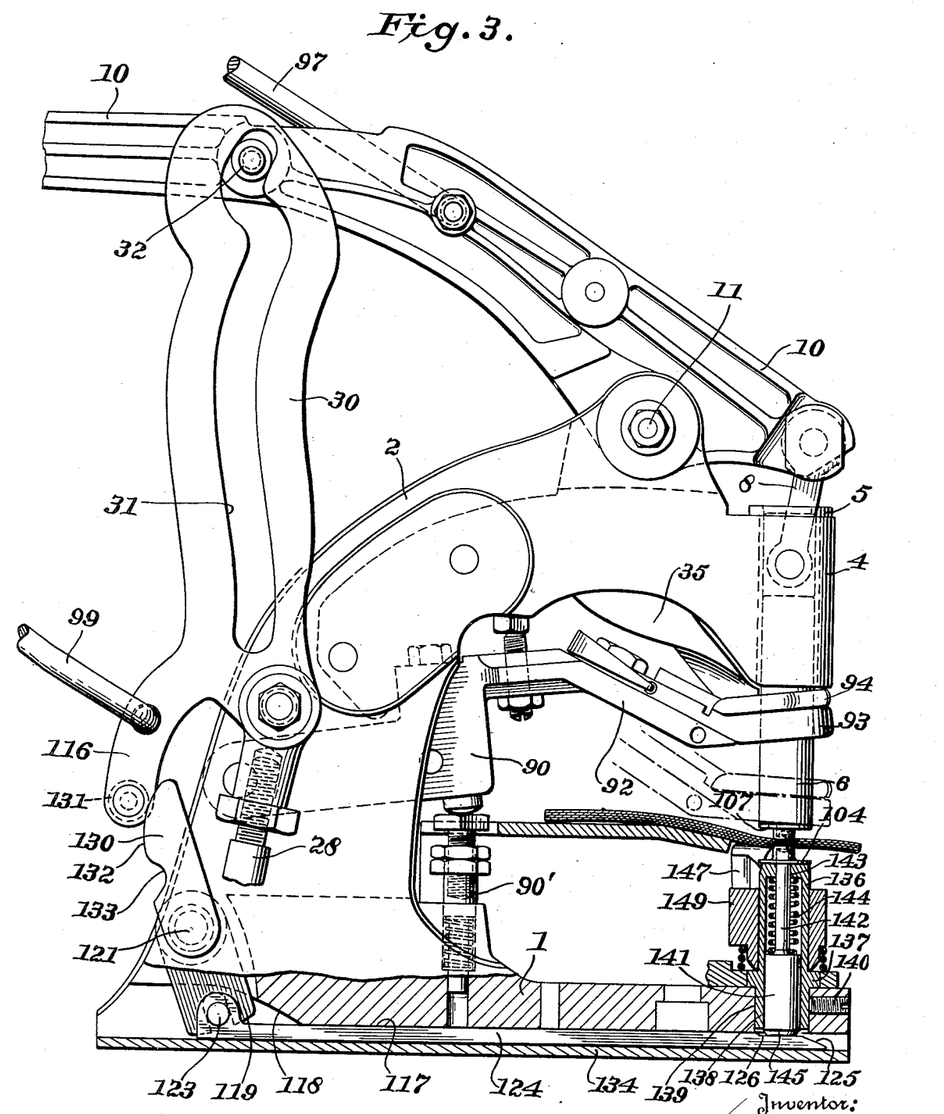
Fig. 3 is a similar view but showing the several parts and mechanism in the position they assume at the instant of attachment.

Referring now to the several views and especially to Figs. 1, 2 and 3, there may be seen a button attaching machine having the base 1 from which extends the curved upright arm 2 integral with the base and slotted as at 3, the slot extending from near the base to the upper end of the arm where said arm is in turn shaped to form a bearing 4 in which there is a bushing 5 in which operates the attaching die or plunger 6. This plunger is slotted at its upper end as at 7 to receive the connecting rod 8 while the other end of the rod is secured to the outer end of the main operating lever 10, the latter being ful-crumed as at 11 in the upright arm 2, as may be seen in the several views.

The lower end of the oscillating lever 10 has the bearing 12 for the reception of a connecting link 14 that may be operated through the rod 14' by a motor and clutch (not shown) controlled by a foot pedal to thus oscillate this lever at will.

Figure 4:
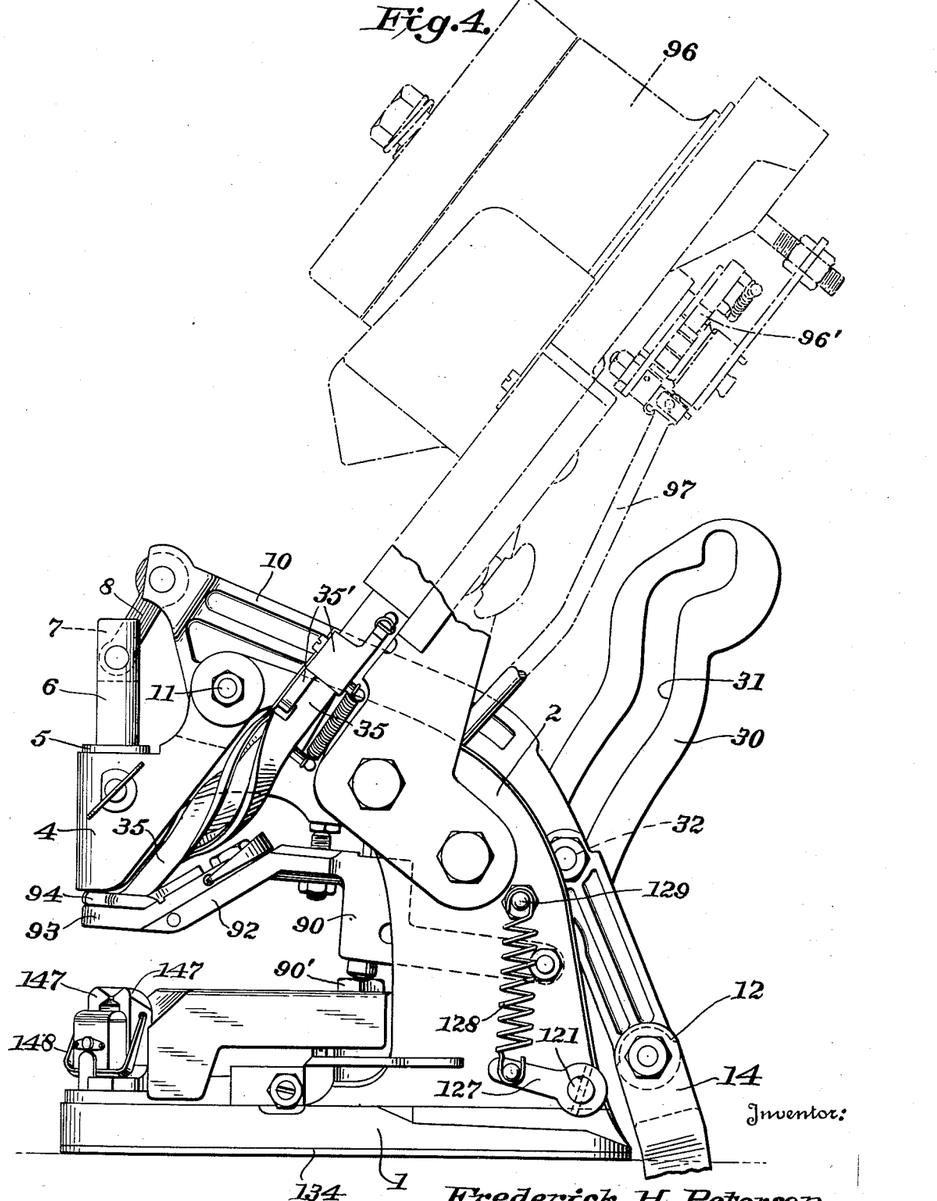
Fig. 4 is a side elevational view of the machine from the top button side, the several parts in their non-operated position and showing the spring and arm that actuates the backing-up post; the dot-and-dash lines showing the hopper and its mechanism for a step-by-step rotation for liberation of the buttons to the tack chute.

As outlined in Fig. 1 and as shown in dot-and-dash lines in Fig. 4, there is the magazine or hopper 96 for holding in this instance the top buttons or, in other words, that part of the double button in which the tack carried by the base button is to be deformed.

The hopper per se forms no part of the present invention and is similar in type to that shown in the patent to F. R. White, December 17, 1929, #1,739,996. This hopper is rotated in a step-by-step movement by the ratchet mechanism 96' when actuated by the rod 97 which is connected to the main operating lever 10. Thus on each upward movement of the main operating lever 10 the hopper is rotated in a step-by-step manner to thus supply the button chute which, as will be mentioned, terminates directly beneath the attaching plunger and adjacent the button holding jaws.

There is also shown an oscillating lever 30 which is actuated by a movement of the main lever 10. This oscillating lever 30 is provided with a slot 31 in which travels the pin or roller 32 which is carried by the operating lever 10.

The construction so far described and illustrated is similar to that set out in my Patent #1,901,375 heretofore mentioned.

Figure 9:
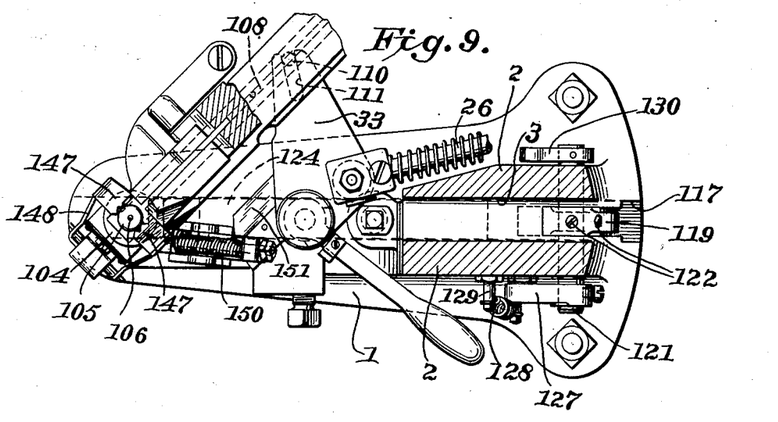
Fig. 9 is a sectional plan view, on a reduced scale, of the base of the machine, showing the feed chute for the base button, the attaching station, the lever for operating the tucker slide and the mechanism for lowering the jaws, operated by the said aforementioned lever.

At the lower end of the oscillating lever 30 is the yoke 28 to which is connected the pitman 26 which in turn is fastened to the bell crank or tucker lever 33 (Fig. 9), which latter is the timing element for a number of the parts of the machine. This pitman, yoke and connections are shown in full detail in my patent just above mentioned.

Before briefly describing the tucker slide which is on the base button side of the machine, there will follow a short description of the means for holding the top buttons just before being acted on by the button attaching plunger.

Referring again for the moment, therefore, to Figs. 3 and 4, there is shown the lower end of the button chute 35 which leads from the hopper 96 to a position beneath the attaching plunger or die 6.

Here may also be seen the arm 90 which is pivoted in the main arm 2, the forward portion 92 of the arm extending in an angular relation and having the jaws 93 mounted thereon. There is a supplemental pair of jaws 94 shown in connection with the jaws 93 for preventing the button from rebounding from the jaws 93 when the button is fed down the heretofore mentioned chute 35.

This arm 90 and its jaws 93 move downwardly on the descent of the plunger 6 and as the button is forced through the jaws they open laterally and the spring pressed post 90' will push them upwardly straddling the plunger 6 until it returns to its upper position (see Fig. 3).

These jaws 93 and supplemental jaws 94 are similar to those also shown in detail in the patent to White #1,577,888.

However, these button holding jaws and chute in their normal position extend in close proximity to the under side of the bearing 4 rather than spaced therefrom, as shown in my previous Patent #1,901,375, as the double button is much greater in height than the single button and tack, and therefore additional space has to be provided between these top button holding jaws and the anvil shortly to be mentioned, on which rests the base button during the attaching operation.

There is a button escapement 35' in the chute 35 which escapement is operated by the main operating lever 10, as it passes the same, so that on an upward movement of the lever 10 (plunger descending) a button will be released just ahead of the plunger so that there will always be a top button in the button holding jaws when the attaching plunger presses against the jaws in its attaching movement.

With the exception of the button holding jaws and tack chute being in closer proximity to the under surface of the bearing 4 the machine so far is of the general type mentioned in the patents heretofore mentioned.

It might be mentioned here that when the main operating lever 10 is raised it not only causes the plunger 6 to push the arm 92 with its button and button holding jaws downwardly, but it will also cause the oscillating lever 30 to move and in turn, through the pitman 26 and yoke 28, move the tucker lever 33 which in turn will force the tucker slide, about to be described, rearwardly to be in a position to engage a base button and move it forward to the attaching anvil about to be described.

It will be noticed that the operation of the lever 10 also rotates the hopper and at the same time liberates a top button in the chute, past the escapement 35' to the button holding jaws 94, and also retracts the rod, shortly to be mentioned, that operates the backing-up post, the main subject matter of the present invention.

Before referring to the backing-up mechanism a brief reference will be made to the base button side of the machine, and only so much of it referred to as is thought necessary to understand how the base buttons are delivered to the attaching anvil.

Referring to Figs. 1, 5, 6, 7 and 9 for the moment, there will be seen a second hopper 100 in which the base buttons are carried, which is in turn rotated through a ratchet mechanism (not shown) similar to the ratchet mechanism under the top button hopper, and there is a rod 99 connected at its one end to the ratchet movement and at its lower end to the finger 116, on the lever 30, which in turn, it will be remembered, also operates the tucker slide about to be mentioned.

Leading from the hopper 100 is the base button chute 101 (see Figs. 1 and 6) in which there is an escapement movement 102 (Fig. 6) to liberate one base button at a time to the tucker slide.

The tucker slide and lock mechanism is described in detail in my pending application Ser. No. 438,315, filed April 9, 1942, so it will be only briefly referred to here.

At the base of the button chute 101 there is the table 103 to which the base buttons are allowed to be fed one at a time.

It might be mentioned that the double button which is to be attached by the machine is shown in Figs. 6 and 11 to 15. It will be seen that the base button 104 is what is known as an openface button and consists of the face or rim together with the integral hub 105 and positioned in the hub and extending therethrough is a tack prong 106. This open top metal button is identical with what I term the "top button" 107, but the base button has the tack affixed to the hub, and the prong, of course, extends therefrom.

By using a double button wherein the parts are identical, the same dies may be used for making the base button and the top button, and then the buttons that are used for the base buttons will have the heated tacks affixed in the bottoms of the hubs.

In both instances, of course, the hubs are perforate, as the tack prong extends through the base button and is to be driven up through the hub in the top button, as will be shortly mentioned.

Referring briefly to the tucker mechanism (Figs. 6, 7, 8 and 9) there is the slide 108 which fits in its housing 109 and there is a pin 110 near its forward end which fits in the cutout portion 111 of the bell crank lever 33 heretofore mentioned.

Thus on an operation of the bell crank lever 33 actuated by the movement of the oscillating lever 30 the slide 108 is advanced and retracted. The slide is also provided with two fingers, one 112 and the other the pivotal finger 113.

Figures 6, 7:
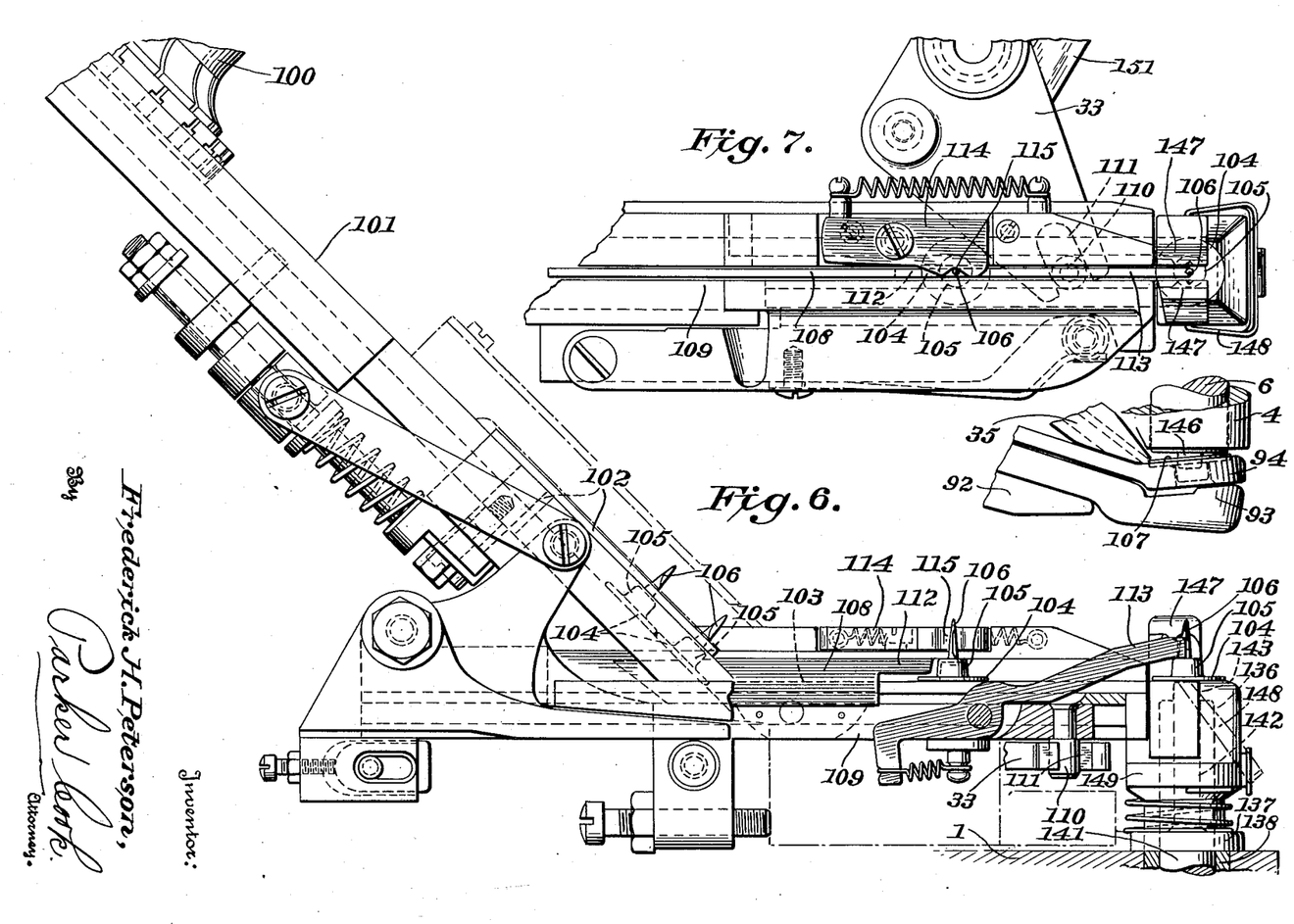
Fig. 6 is an enlarged detail view, partly in section, illustrating the base button feeding chute, tucker mechanism and attaching station, backing-up post for the base button; a fragmentary portion of the attaching plunger and top button holding jaws being shown in position about the attaching station to illustrate its relative position with respect to the attaching station.
Fig. 7 is a fragmentary top plan view of the tucker mechanism, showing a base button at the transfer point and one at the attaching station, together with a portion of the lever that operates the said tucker slide.
Figures 8, 10, 11, 12, 13, 14, 15, 16:
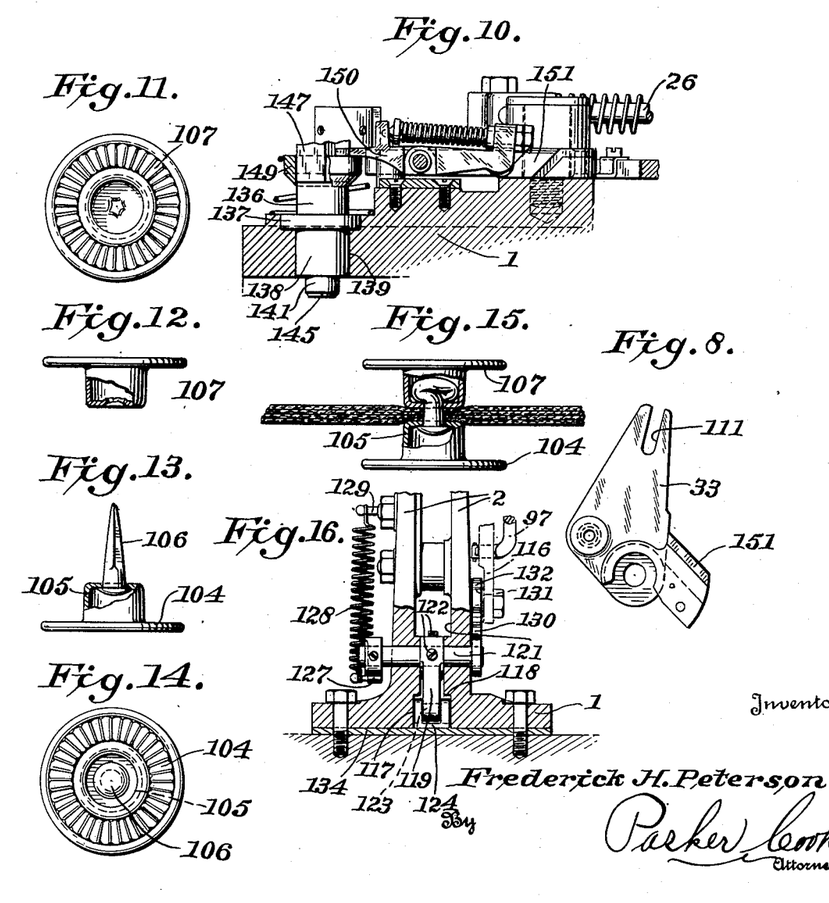
Fig. 8 is a bottom plan view, on a reduced scale, of the lever that operates the tucker slide.
Fig. 10 is a side elevation, on a reduced scale, of the means for lowering the jaws during the attaching operation; a fragment of the machine base being shown in section.
Fig. 11 is a top plan view of the top button.
Fig. 12 is a side elevation thereof, the hub being partly broken away for the sake of clearness of illustration.
Fig. 13 is a similar view of the base button, showing the tack secured therein.
Fig. 14 is a bottom plan view of said base button.
Fig. 15 is a view, partly in section, showing the two buttons attached in a back-to-back position on either side of the fabric.
Fig. 16 is a sectional view, from the rear of the machine, on a reduced scale, of certain of the parts showing the means for operating the cam-faced rod which actuates the backing-up post in the attaching station.

As also may be seen in Fig. 7, there is a spring held gate 114 which extends into the path of the tucker slide fingers and in this gate there is a depression 115. Thus on a forward movement of the tucker slide, the finger 112 when in a retracted position will be behind one of the base buttons that has been fed to the table 103 and will advance it to the depression 115 in the gate 114 whereupon the pivotal finger 113 will, when in its retracted position, contact with the prong of the button which has been previously advanced to the gate 114 to force it out to the attaching station. The manner in which the escapement is regulated and the lock for the tucker mechanism, etc., is described in detail in the pending application, and it is thought that the above description is sufficient to understand the feeding of the base button out to the attaching station where it is to be attached to the cloth and to its top button.

The dimensions of the trackway in the button chute are slightly changed from that shown in my previous application to accommodate the different size of button used.

The hopper 100 is also different from that shown in my previous patent, because here it is to feed a tack-carrying button similar to the top button, rather than the simple tack or rivet, as is the general practice; but the operation, it will be understood, is just the same.

Now referring more particularly to the backing-up mechanism for the tack and base button, reference is again made to the oscillating lever 30 and in Figs. 2 and 3 there will be seen thereon the additional finger 116 (not shown in the previous patents) and this finger formed on the lower end of the oscillating lever 30, together with a spring actuated arm 130 pivotally mounted at the rear of the base of the machine and a cam-faced slide element is what operates the backing-up post in the attaching station.

Still referring to Figs. 2 and 3 for the moment, it will be noticed that in the base 1 of the machine and extending from its rear end to its forward end is a slot 117, which slot is enlarged as at 118 to receive the bottom end of an arm 119, which arm is carried on a cross shaft 121 and locked by the set screws 122. The lower end of the arm 119 engages a pin 123 which is carried by the slide rod 124 which has the hardened bevelled cam-face 125 at its forward end together with the seat 126 just behind the bevelled portion 125.

Pinned to one end of the cross shaft 121 is the arm 127 to which is secured the spring 128 which in turn is fastened at its upper end to the post 129 mounted on the arm 2 of the machine. (Figs. 4 and 5.)

Mounted on the opposite end of the cross shaft 121 is the cam-lever 130 which is to be operated by contact with a roller 131 mounted on the end of the finger 116 of the oscillating lever 30. This cam-lever 130 has the nose or cam face 132 and the depressed portion 113.

It will be noticed in Fig. 2 that when the main operating lever 10 is in its downward position—that is, when the machine is at rest—the oscillating lever 30 will be in its rearward position, and the roller 131 on the finger 116 will rest in the depression 133, having pushed the cam lever 130 to its forwardmost position which in turn, through the arm 119, has retracted the slide rod 124. On the other hand (referring to Fig. 3), when the main operating lever 10 is in its uppermost position and the oscillating lever 30 has moved forward, the finger 116 has moved rearwardly to permit the cam lever 120 to also move rearwardly, the cam face 132 thereof, however, always bearing against its roller 131.

The rearward movement of this arm 130 is caused by the tension of the spring 128 pulling up on the arm 127 which, it will be remembered, is connected to the cross shaft 121, and a partial turning of this cross shaft will cause the slide rod 124 to move forwardly and through its cam-face 125, raise the backing-up post, about to be described.

There is a steel plate 134 on the bottom of the base 1 on which the slide rod 124 rests, and this steel plate, of course, will be flush with the table or stand on which the machine is to be mounted. Thus the slide rod with its cammed forward end, will be in turn supported to withstand the shock that will be transmitted to it through the backing-up post about to be mentioned.

Thus on every operation of the machine, when the main operating lever 10 is being elevated, the spring 128 will force the slide rod forwardly and every time the actuating lever 10 is lowered the finger 116 contacting with the cam lever 130 will pull the slide rod rearwardly.

Now referring to the anvil which supports the base button with its tack during the attaching operation, it will be seen that it is at the outer end of the tucker slide table so that when the base button is advanced from the notch of the gate 114, it will rest on the anvil ready for attachment. The tack-holding jaws for supporting this base button and the mode of operation will be referred to briefly as the specification proceeds.

The present anvil differs from the anvil shown in my Patent #1,901,375 in that it consists of a hollow tube-like member 136 which is provided near its lower end with a flange 137 that rests on the top surface of the table while the lower end 138 fits in the bore 139 in the table, as may be seen in Figs. 2, 3 and 6. A set screw 140 is also provided to securely hold this hollow tube-like anvil in position.

Fitted for slidable movement in this anvil is the backing-up post 141 whose lower end is of substantially the same diameter as the bore of the anvil to provide a close sliding fit, whereas the upper portion of the post is reduced as at 142 and passes through the opening 143 in the top and centrally of the anvil.

The diameter of the upper end of this post is just slightly less than the diameter of the open face hub of the button, so that when this backing-up post is elevated, the upper end of the post will pass up into the hub of the jaw-held facedown base button, as may be seen in Fig. 3.

Also, there is a spring 144 within the hollow anvil surrounding the upper portion of the post and bearing against the inner upper surface of the anvil and against the enlarged lower section of the post and this spring is normally under compression, so as to force the post to its lowermost position or, in other words, to the position shwn in Fig. 2.

The lower end of the post may be slightly bevelled or rounded on its edge as at 145, so that when the rod 124 is advanced, the cam surface 125 will easily slide under the post to elevate the said post, which will then come to rest on the top surface or seat 126, as may be clearly seen in Fig. 3.

If the backing-up post wears after a great number of operations, it is a simple matter to remove the plate 134 and quickly insert a new post. This backing-up post, of course, will be of hardened steel, as the force exerted on the tack on the downward stroke of the plunger during the clenching of the tack will be transferred to this backing-up post.

The attaching plunger 6 movable in the bushing 5 will have at its lower end a die 146, which die will be provided with the die cavity or, in other words, the die will be concave on its face so that when the plunger with its die is forced down on the tack it will curl the prong of the tack within the top button and deform the same to thus hold the two button parts tightly together.

The die 146, it will be understood, also extends down into the hub of the open face top button, so that we have the backing-up post fitting in the inverted base button during the attaching step and we have the die of the attaching plunger extending well down within the hub of the open-face top button, and also assuring a well deformed tack prong within the top button.

The tack jaws that overlie the anvil to hold the base button are very similar to those shown in my patent heretofore referred to, #1,901,375, and are operated from the heretofore mentioned tucker lever 33.

Briefly, these jaws 147 may be seen in Figs. 2 and 3 and especially in Fig. 4 and straddle and overlie the anvil post 136 and are held in their closed position by the spring 148. They are mounted on a carrier 149 and this carrier is in turn depressed by the cam lever 150 which is formed of two parts, as may be seen in Fig. 10, the rear portion of the lever being operated by a cam surface 151 formed on the end of the heretofore mentioned lever 33.

Of course, the top button being forced against these jaws partly opens the jaws and then the timing of the cam lever 150 riding on the cam surface of the lever 33 is such that the jaws remain open or in their lowered position for a certain interval of time, to wit: about one-third of the upward movement of the plunger 6 so that the operator will have plenty of time to remove the cloth with its button from the anvil while the jaws are still in their open position.

For a full description of the jaws and their operating mechanism, further reference is made to my former Patent #1,901,375 and although in that instance the anvil is solid, it will be understood that the jaws and carrier operate on the same principle.

Before briefly describing the operation, it will be seen, therefore, that after the double button has been attached to the cloth and as the attaching plunger rises, the backing-up post will also start to be retracted and the jaws will still be in their open position, so that none of these parts just mentioned in any way interfere with the movement of the cloth to attach a succeeding button.

Operation

Having described the several parts, a brief description of the operation follows.

Assuming there is a top button 107 within the button receiving jaws 93 directly beenath the attaching plunger 6 and assuming that there is a base button 104 resting on the anvil 136, the cloth or tent to which the double button is to be attached will be placed directly over the jaws 147 and a clutch (not shown) operated which will, through a rod 14', move the main operating lever 10 upwardly. This will start the attaching plunger 6, with its die 146 thereon, in its downward course, and will also move the oscillating lever 30 forwardly, which lever, it will be remembered, is connected to the bell crank or tucker lever 33, through the pitman 26.

After the plunger has descended about one-quarter of its stroke, the heel portion of the compound cam lever 150 will be contacted by the cam surface 151 to start to bear downwardly on the carrier 149 to thus lower and open the tack receiver jaws 147. In the meantime the plunger 6 will have passed downwardly and forced the top button and the jaws 93 down on the upper surface of the jaws 147, the jaw carrier 92 having moved to its lowermost position and then straddled the plunger 6 and the jaws thereafter having snapped up again under the action of the spring pressed plungers 90' to the position shown in Fig. 3.

In the meantime the tucker slide, through the operation of the lever 33, has been retracted by its pitman 26 and the oscillating lever 30, so that on the return downward movement of the main operating lever the tucker fingers will advance another base button out to the gate and the one from the gate out to the anvil.

The base button escapement will have been operated and likewise the escapement will have been operated for the top button, so that on each downward movement of the plunger or, in other words, each upward movement of the main operating lever 10, there will always be a base button on the anvil and a top button in the button holding jaws preceding the attaching action.

This is similar to the action shown in my heretofore mentioned patent, to wit: #1,901,375.

Additionally, however, when the main operating lever 10 is in its lowermost position (Fig. 2) the finger 116 with its roller 131 will be at rest in the depression 133, and the slide bar 124 will be in its rearmost position as shown in Fig. 2, the backing-up post also being in its lowermost or retracted position. It is necessary that this post be in its lowermost position at this time, otherwise the same extending through the top of the anvil in front of the tucker slide table would have interfered and prevented a succeeding base button from being moved by the tucker slide out on the anvil.

Likewise this is the time when the operator moves the cloth either into or out of position, and unless means were provided for withdrawing the post, it will be seen that it would not only hinder the button from being positioned on the anvil but it would hinder the free movement of the cloth and its attached buttons.

However, as heretofore mentioned, the spring 144 normally holds the backing-up post in its retracted position when the machine is at rest.

As this main operating lever 10 is raised to perform the different operations just above mentioned, it will also move the oscillating lever 30 forwardly and the finger 116 rearwardly, permitting the upper end of the cam shaped lever 130 to also move rearwardly under the action of the spring 128 pulling on the arm 127 attached to the cross shaft 121 which will cause the arm 127 to rise and partially revolve the cross shaft thus moving the finger 116 rearwardly and the slide rod 124 will then be advanced under the backing-up post 141. Due to the cam surface 125 on the forward end of the slide rod, the backing-up post will be elevated so that its upper end extends up into the hub of the inverted button and against the head of the tack carried in the hub of the button.

As heretofore mentioned, as the main operating lever 10 reaches the top of its stroke, the die 146 fitting within the upright top button which, it will be remembered, has been lowered, will deform the tack prong now extending within the hub of the upper button, and thus tightly fasten the double button on opposite surfaces of the cloth.

The position of the slide rod and the backing-up post is illustrated, at the instant of attachment, in Fig. 3.

After the button has been attached and the rear end of the main operating lever 10 lowered, the attaching plunger 6 will have risen so that the die 146 is no longer in the hub of the upper button and the upper end of the oscillating lever 30 will be moved rearwardly so that the finger 116 will ride down the cam surface 132 of the lever 130, forcing it forwardly and, on the turning of the shaft 121, will retract the slide bar 124, thus permitting the spring within the anvil to force the backing-up post to its retracted lowermost position and out of the way.

The lowering of the main operating lever 10 and the movement of the oscillating lever 30 will operate the tucker slide to advance another button out to the now unobstructed surface of the anvil.

It will also have operated the escapement in the base button chute and, through the operation of the bell crank lever 33, permitted the tack jaws to close again, which need not be described in detail, as these operations are set forth in my Patent #1,901,375 heretofore mentioned.

After the double button has been attached and the backing-up post lowered, it will be seen that the operator can freely move the cloth with its attached button; in fact, the succeeding button on passing from the table to the anvil, will force the attached button and its cloth out from the anvil.

From the foregoing it will be seen that I have provided a button-attaching machine which is wholly automatice and in which two like halves of buttons will be fed to the attaching anvil or station in a back-to-back relationship, the two buttons being identical with the exception that one carries a tack previously placed within the base button, which tack is then clenched within the top button so that there will be identical buttons on the opposite surfaces of the cloth and in a back-to-back relationship.

By having a backing-up post for the attaching operation not only is the prong curled or deformed in the top button half, but the tack head in the base button is slightly spread due to the force of the blow, thus assuring a tight, rigid connection between the two elements of the button.

It will also be seen that the backing-up post is projected into position just before the attaching operation, so that it in no way interferes with the feed of the buttons to the anvil and inasmuch as it is withdrawn right after the operation, it will be seen that it in no way interferes with the operator after the button is attached, and he or she may easily slide the cloth over the anvil in the operation of removing it preparatory to another attaching operation.

Finally, it will be understood that I have not described in detail the operation of the machine or the different timing operations and synchronizing movements caused by the raising and lowering of the main operating lever, but these various movements may be understood from my patents above mentioned and a tucker mechanism is shown in detail in my pending application.

It will be appreciated that the machine is very speedy in operation and the actual attaching of the buttons takes place in a rapid and speedy manner.

Having thus described my invention, what I claim as new and desire to secure by Letters Patent is:

A machine for attaching two open face hollow hub buttons to a fabric in a back-to-back relationship, the lower button having a headed tack mounted within the upper end of the hub; including a hollow anvil, a spring pressed post movingly mounted in the anvil, a movable plunger mounted over the anvil for deforming the tack in the hub of the top button after the tack has pierced the fabric, a bevel-ended slide rod mounted beneath the post in said anvil, a lever for actuating the plunger, an oscillating lever connected to said aforementioned lever, said oscillating lever being operably associated with the said slide rod so that a downward movement of the plunger operating lever to elevate said plunger will also move the lower end of the oscillating lever forwardly to retract the bevel end of the slide rod from beneath the spring pressed post and permit said post to lower; spring means also associated with said slide rod to advance the same and force the bevel end under the post to thus project the post within the hub of the lower button carrying the tack to contact with the head of the tack and back up the same when the plunger descends to deform said tack prong in the hub of the upper button.

FREDERICK H. PETERSON.